United States Patent Office 3,711,434
Patented Jan. 16, 1973

3,711,434
LIQUID COATING COMPOSITION COMPRISING AMINO RESIN AND VINYL-MODIFIED ALKYD RESIN
Tadashi Watanabe, Koichiro Murata, Naozumi Iwasawa, and Tsuyoshi Okinaga, Hiratsuka, Japan, assignors to Kansai Paint Company, Limited, Hyogo-ken, Japan
No Drawing. Filed Feb. 17, 1971, Ser. No. 116,220
Claims priority, application Japan, Feb. 23, 1970, 45/14,813
Int. Cl. C09d 3/66, 3/52
U.S. Cl. 260—21
12 Claims

ABSTRACT OF THE DISCLOSURE

A liquid coating composition comprising:

(A) 5 to 40 parts by weight of amino resins,
(B) 95 to 60 parts by weight of vinyl-modified alkyd resins, and
(C) an organic solvent or a mixture of the organic solvent and water, wherein said vinyl-modified alkyd resins are obtained by graft-polymerizing a vinyl monomer or a mixture of vinyl monomers onto alkyd resins after said alkyd resins are obtained by reacting polyalcohol with carboxylic acids, said alkyd resins, containing 5 to 60% by weight of hexahydrophthalic acid and/or its anhydride.

---

This invention relates to a liquid coating composition containing novel vinyl-modified alkyd resins as an alkyd resin component. More particularly, the invention relates to a liquid coating composition comprising usual aminoplast resins and novel vinyl-modified alkyd resins wherein said vinyl-modified alkyd resins are obtained by graft-polymerizing a vinyl monomer or a mixture of vinyl monomers to alkyd resins in which hexahydrophthalic acid and/or its anhydride are contained as an acid component or a part of an acid component.

Previously, the use of unsaturated fatty acids having double bonds as one component of alkyd resins resulted in bad efficiency of graft polymerization when such alkyd resins are graft-polymerized with vinyl monomers. The use of maleic anhydride (or fumaric acid) made it difficult to obtain alkyd resins having high degree of condensation. These alkyd resins are very hard to graft-polymerize with vinyl monomers, except with a very few vinyl monomers such as styrene. Accordingly, in order that these alkyd resins may be graft-polymerized with vinyl monomers, usually it is necessary to add styrene as an essential ingredient. Moreover, the vinyl monomers to be graft-polymerized are restricted to those that can react with styrene. The above mentioned several problems are known to be disadvantages in producing prior vinyl graft alkyd resins. From the foregoing it can be seen that the use of these graft-polymerized alkyd resins as coating materials does not permit coated films having excellent film properties (for example, smoothness, hardness, flexibility, adhesion, chemical resistance, water resisting property and the like to be obtained. In order to overcome these disadvantages we have made the following proposal in our copending United States application Ser. No. 830,843, now U.S. Pat. No. 3,634,351, issued Jan. 11, 1972:

The above mentioned various deficiencies were overcome by making graft polymerized with vinyl monomers, onto alkyd resins comprising as its component the following compounds:

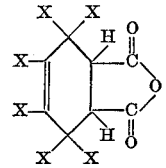 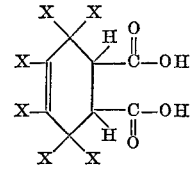

(These compounds are abbreviated "compound I." In the formula, X represents halogen atom and/or hydrogen atom) or

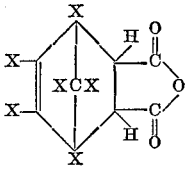 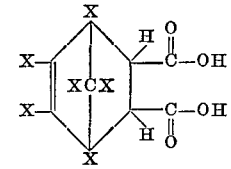

(These compounds are abbreviated "compound II." In the formula, X represents halogen atom and/or hydrogen atom.)

We have further proceeded with the study on our copending United States application Ser. No. 830,843. As a result, it has been discovered that in the graft-polymerization reaction of the alkyd resins comprising compound I and/or compound II as an acid component or a part of an acid component with vinyl monomers, a part of the hydrogen atoms or halogen atoms in allyl position remain in graft-polymers without participating in the graft-polymerization reaction. These atoms suffer autoxidation. Accordingly, these alkyd resins, when used as coating materials, are the cause of yellowing by over-baking and moreover have not sufficient weather resistance. In the present invention we have succeeded, by grafting vinyl monomers onto alkyd resins comprising hexahydrophthalic acid and/or its anhydride as an acid component or a part of an acid component, in overcoming the above described disadvantages presented in our copending United States application Ser. No. 830,843 without deteriorating the other properties. As indicated in the foregoing discussion, this invention relates to a liquid coating composition comprising (A) 5 to 40 parts by weight of amino resins, (B) 95 to 60 parts by weight of vinyl-modified alkyd resins wherein said vinyl-modified alkyd resins are obtained by a graft-polymerizing a vinyl monomer or a mixture of vinyl monomers onto alkyd resins after said alkyd resins are obtained by reacting polyhydric alcohol with carboxylic acid, said alkyd resins containing 5 to 60% by weight of hexahydrophthalic acid and/or its anhydride as an acid component or a part of an acid component, and (C) an organic solvent and/or water. When used as a part of an acid component, hexahydrophthalic acid and/or its anhydride are blended with other carboxylic acids used usually as an acid component of usual alkyd resins.

One advantage of this invention is that, because of the vinyl-modified alkyd resins in this invention having double bonds or less double bonds than the graft alkyd resins of our copending U.S. application Ser. No. 830,- 843, the vinyl-modified alkyd resins are subject to less yellowing than the alkyd resins of our previous graft alkyd resins by over-baking, and weather resistance can be markedly improved without impairing advantages of our previous resins.

A further advantage of this invention is that, since it is possible to carry out synthesis reaction of alkyd resins at temperatures above 230° C., and then to obtain resins having low acid value of 3 to 10, the resins have a high degree of condensation and high molecular weight are obtainable. Moreover, the kinds of vinyl monomers employed in modifying the alkyd resins thus obtained are not subject to the restrictions in the case of using maleic acid and/or fumalic acid as an acid component of alkyd resins, and as a result, they are easy to modify with vinyl monomers, and have good mutual solubility with other coating resins. Furthermore, the alkyd resins for preparing the vinyl-modified alkyd resin using alkyd component in this invention can be utilized in the form of oil- and/or fatty acid-modified alkyd resins containing 10–40% by weight of oil and/or fatty acid, or oil-free alkyd resins containing no oil and/or fatty acid. Still more, in this invention, a liquid coating composition as a water thinnable coating can be obtained by using a water thinnable amino-plast resins and the vinyl-modified alkyd resins obtained from alkyd resins containing hexahydrophthalic acid and/or its anhydride as an acid component or a part of an acid component modified with vinyl monomers having carboxylic group such as acrylic acid and/or methacrylic acid as a vinyl monomer component or a part of vinyl monomer component. The water-thinnable vinyl-modified alkyd resins thus obtained must have an acid value of 40 to 150. The water-thinnable vinyl-modified alkyd resins used in this invention must be neutralized by ammonium hydroxide, amines and/or alkalis. Typical amines which may be used herein are diethylamine, dimethylamine, trimethanolamine, diethanolamine, N,N-dimethylethanolamine, trimethylamine, triethylamine, morphorine, and diisopropylamine. Typical alkalis which may be used herein are lithium hydroxide, sodium hydroxide, and potassium hydroxide. If necessary, the following co-solvents can be used in order to improve water solubility: alcohols such as methanol, ethanol, propanol, isopropanol, n-butanol, sec-butanol, tert-butanol, isobutanol; glycolethers such as ethylene glycol-monomethylether, monoethylether, mono-iso-propylether and monobutylether; and these co-solvents may be used alone or as a suitable mixture thereof.

The process for producing the vinyl-modified alkyd resins used in this invention will be described in detail hereinafter. The alkyd resins containing hexahydrophthalic acid and/or its anhydride as an acid component or a part of an acid component are obtained by reacting 1.0 mol of polyhydric alcohol with 0.8 to 1.1 mols of polybasic acid and less than 1.0 mol of monobasic acid as a mol ratio. The cooking process is one for preparing the conventional alkyd resins.

Trihydric and tetrahydric alcohols which may be used, include, for example, glycerine, trimethylolethane, trimethylolpropane, 1,3,6-hexanetriol and pentaerythritol.

Glycols which may be used in the invention include primary or secondary alcoholic glycols, for example 1,2-glycols, such as ethylene glyocl, propylene glycol, 1,2-butanediol, 1,2-pentanediol, 2,3-pentanediol, threo-2,3-pentanediol, erythro-2,3-pentanediol and 3-methyl-1,2-butanediol; 1,3-glycols, such as trimethylene glycol, $\beta$-butylene glycol; 2,4-pentanediol, 2,2-dimethyltrimethylene glycol, 2,2-dimethyl-1,3-butanediol and 2,2-dimethyl-1,3-pentanediol; 1,4-glycols, such as tetramethylene glycol, 1,4-pentanediol, 3-methyl-2,5-pentanediol, 1,4-hexanediol and 2,5-hexanediol; and 1,5-glycols or 1,6-glycols, such as pentamethylene glycol, 1,5-hexandiol and hexamethylene glycol. The glycol(s) must be used in combination with at least one of the trihydric and tetrahydric alcohol(s) to obtain the vinyl-modified alkyd resins having 2.0 to 5.0% by weight of free hydroxyl groups. In the case of using a vinyl monomer mixture containing vinyl monomer having one hydroxyl group as a part of the mixture, the total free hydroxyl groups of hydroxyl groups in the vinyl monomers and hydroxyl groups in unmodified alkyd resins should be 2.0 to 5.0% by weight of free hydroxyl groups.

The "total hydroxyl groups" is defined by the following formula:

$$\text{Total hydroxyl groups (percent)} = \frac{\text{mols of hydroxyl groups} \times 17}{\text{(total weight of vinyl-modified alkyd resin raw materials)} - \text{(theoretical weight of by-product)}} \times 100$$

In the above formula, "mols of free hydroxyl groups" is defined by adding mols of residue hydroxyl groups in unmodified alkyd resins and mols of hydroxyl groups in the vinyl monomers.

The alkyd resins for preparing vinyl-modified alkyd resins as a alkyd component in this invention must contain hexhydrophthalic acid and/or its anhydride as an acid component or a part of an acid component. This unmodified alkyd resins must contain 5 to 60% by weight of hexahydrophthalic acid and/or its anhydride in the resins. In the case of using hexahydrophthalic acid and/or its anhydride as a part of an acid component, the polybasic acids and, if necessary, monobasic acid may be used as mixture with the acid and/or its anhydride above-mentioned.

Polybasic acids which may be used, include, for example, aromatic carboxylic acids, such as phthalic acid, isophthalic acid, terephthalic acid and trimellitic acid and anhydrides thereof; aliphatic dibasic carboxylic acids, for example succinic acid, adipic acid, azeraic acid and sebacic acid and acid anhydries thereof; and mixtures of any thereof.

Monobasic acids which may be used, include, for example, coconut oil, cotton seed oil, soyabean oil, rice oil, safflower oil and their fatty acids or mixture thereof. Moreover monobasic acids which may be used, include, for example, from $C_8$ to $C_{18}$ aliphatic monobasic acids such as caprylic acid, pelargonic acid, capric acid, undecylic acid, lauric acid, tridecylic acid, myristic acid, pentadecyclic acid, palmitic acid heptadecylic acid, stearic acid, lauroleic acid, myristoleic acid, palmitoleic acid, oleic acid, ricinoleic acid, linoleic acid, linolenic acid, eleostearic acid, and licanic acid and mixture thereof.

Alkyd resins thus obtained are modified with vinyl monomer(s) in the following manner. First, the unmodified alkyd resin is dissolved in a suitable solvent (for example, hydrocarbon solvents, alcohol solvents, ketone solvents, ester solvents and ether solvents). Next, reaction of the unmodified alkyd resin with vinyl monomers is realized either by dropping vinyl monomers into the alkyd resin solution or by mixing the alkyd resin solution with vinyl monomers. In the former case, a mixture of vinyl monomers and radical polymerization initiator is dropped into the alkyd resin solution in a reaction vessel usually for a period of 30 min.–3 hr., while in the latter case, in which the alkyd resin solution and vinyl monomers are from the first mixed prior to reaction, a solution of radical polymerization initiator in a suitable solvent is dropped into the above mixture in a reaction vessel usually for a period of from 30 minutes to 3 hours. The reaction temperature of said mixture may be usually in the range of from 80 to 140° C. Examples of suitable radical polymerization initiators include benzoyl peroxide, azobisisobutyronitrile, azo-bis-dimethyl valeronitrile, tert-butyl-perbenzoate, tert-butyl hydroperoxide, lauroyl-peroxide and di-tertiary butylperoxide. The preferred amount of radical polymerization initiator to be added is from 0.5 to 4.0 parts by weight to 100 parts by weight of the unmodified alkyd resin and vinyl monomers. The mixing ratio of the unmodified alkyd resin and vinyl monomer can be varied as from 10 to 90% by weight of the unmodified alkyd resin, depending upon purposes. Vinyl monomers may be used in a single kind or two kinds and more.

Among vinyl monomers to be employed for preparing the vinyl-modified alkyd resin are, for example, styrene, vinyl toluene, methyl acrylate, ethyl acrylate, butyl acrylate, 2-ethyl hexyl acrylate, methyl methacrylate, ethyl methacrylate, butyl methacrylate, lauryl methacrylate, 2- hydroxy-ethyl methacrylate, 2-hydroxyethyl acrylate, 2-hydroxy propyl methacrylate, 2-hydroxypropyl acrylate, acrylic acid, methacrylic acid, acrylonitrile, acrylamide, α-methyl styrene, methacrylonitrile, glycidylmethacrylate, and vinyl acetate.

The amino resins useful in this invention are conventional amino resins for coatings such as alcohol modified melamine-formaldehyde condensates, for example butylated, iso-butylated, sec-butylated, ethylated, methylated, propylated and iso-propylated melamine - formaldehyde condensate; benzoguanamine - formaldehyde condensates modified by the same alcohols. From 5 to 40 parts by weight of amino resin should be blended with from 95 to 60 parts by weight of the vinyl-modified alkyd resin as a resin solid.

Vinyl-modified alkyl resins of the present invention are useful as coating material. When they are used as one component of coating resins, their properties such as mutual solubility with other resins, hardness of coated films, adhesive property, impact resistance, bending resistance, solvent resisting property and chemical resistance are as excellent as those of graft polymerized alkyd resins proposed in our copending United States application Ser. No. 830,843. Moreover, their properties to resist yellowing by over-baking and weather resistance are better than those of graft polymerized alkyd resins proposed in our copending United States application Ser. No. 830,843.

A better understanding of this invention will be gained by the following illustrative examples which are not to be construed as limitations on the present invention and in which all parts of starting materials to be mixed are by weight unless otherwise indicated.

(I) PROCESS FOR PRODUCING ALKYD RESINS

Example 1

1068 parts of isophthalic acid, 534 parts of hexahydrophthalic anhydride, 255 parts of adipic acid, 909 parts of neopentyl glycol and 591 parts of trimethylolpropane are charged into a reaction vessel provided with a thermometer, stirrer, water separator and gas-inlet pipe and stirred in an atmosphere of circulating nitrogen gas until the temperature of the contents is elevated to 160° C. Then, after it is recognized that condensed water begins to flow out, the temperature of the contents is gradually elevated to 230° C., and thereafter the reaction is carried out keeping the temperature at this level. In the process, the acid value of the content is measured and when an acid value of approximately 6 is obtained, the reaction is completed.

As a result of this reaction is obtained an oil free alkyd resin having:

resin acid value—8.9
resin solution viscosity—X (about 12.9 stokes)

(In order to determine the resin solution viscosity, a solution having resin component of 60% is prepared using ethylene glycol monobutyl ether and a Gardner type bubble viscometer is employed. In all examples of this invention measurement of viscosity is performed at a temperature of 25° C.)

This oil free alkyd resin is diluted in a solvent mixture consisting of 2378 parts xylene and 594 parts ethylene glycol monobutyl ether, thereby obtaining a resin solution having resin component of 50%.

Reference 1.—1068 parts of isophthalic acid, 534 parts of tetrahydrophthalic anhydride, 255 parts of adipic acid, 909 parts of neopentyl glycol and 591 parts of trimethylolpropane are charged into a reaction vessel equipped in the same manner as in Example 1. Then, the same reaction operation is carried out as in Example 1 and when the acid value of the contents becomes about 9, the reaction is completed.

As a result of this reaction is obtained an oil free alkyd resin having:

resin acid value—8.9
resin viscosity—Y (about 17.6 stokes)

(Resin viscosity is measured in the same way as in Example 1.)

This oil free alkyd resin is diluted in a solvent mixture consisting of 2378 parts xylene and 594 parts ethylene glycol monobutyl ether, thereby obtaining a resin solution having resin component of 50%.

Example 2

1011 parts of phthalic anhydride, 215 parts of hexahydrophthalic anhydride, 237 parts of adipic acid, 882 parts of trimethylolethane, 458 parts of neopentyl glycol and 458 parts of coconut oil fatty acid are charged into a reaction vessel equipped in the same manner as in Example 1. Then, the same reaction operation is carried out as in Example 1 and when the acid value of the contents becomes about 6, the reaction is completed.

As a result of this reaction is obtained an oil-modified alkyd resin having:

resin acid value—3.4
resin viscosity—T–U (about 5.50–6.27 stokes)

(In order to determine the resin viscosity a solution having resin component of 60% is prepared utilizing xylene and a Gardner type bubble viscometer is employed.)

Oil length—15.1%

This oil-modified alkyd resin is diluted using 1500 parts of xylene, thereby obtaining a resin solution having resin component of 66.7%.

Example 3

864 parts of phthalic anhydride, 600 parts of hexahydrophthalic anhydride, 712 parts of pentaerythrite, 285 parts of ethylene glycol and 1200 parts of coconut fatty acid are charged into a reaction vessel equipped in the same manner as in Example 1. Then, the same reaction operation is carried out as in Example 1 and when the acid value of the content becomes about 8, the reaction is completed.

As a result of this reaction is obtained an oil-modified alkyd resin having:

resin acid value—5.6
resin viscosity—U (about 6.27 stokes)

(Resin viscosity is measured in the same way as in Example 2.)

Oil length—35.5%

This oil-modified alkyd resin is diluted using 2030 parts of ethylene glycol monobutyl ether, thereby obtaining a resin solution having resin component of 62.5%.

Example 4

1800 parts of hexahydrophthalic anhydride, 842 parts of neopentyl glycol and 549 parts of trimethylolpropane are charged into a reaction vessel equipped in the same way as in Example 1. Then, the same reaction operation is carried out as in Example 1 and when the acid value of the content becomes about 10, the reaction is completed.

As a result of this reaction is obtained an oil free alkyd resin having:

resin acid value—9.5
resin viscosity—P–Q (4.00–4.35 stokes)

(In order to determine the resin viscosity a solution having resin component of 60% is prepared using ethylene glycol monobutyl ether and a Gardner type bubble viscometer is employed.)

This oil free alkyd resin is diluted in a solvent mixture consisting of 2400 parts xylol, 600 parts ethylene glycol monobutylether, thereby obtaining a resin solution having resin component of 50%.

Reference 2.—1800 parts of tetrahydrophthalic anhydried, 842 parts of neopentyl glycol and 549 parts of trimethylolpropane are charged into a reaction vessel equipped in the same way as in Example 1. Then, the same reaction operation is carried out as in Example 1 and when the acid value of the content becomes about 10, the reaction is completed.

As a result of this reaction is obtained an oil free alkyd resin having:

acid value of resin—9.2
viscosity of resin solution—P–Q (4.00–4.35 stokes)

(In order to determine the viscosity of resin solution a solution having resin component of 60% is prepared using ethylene glycol monobutyl ether and a Gardner type bubble viscometer is employed.)

This oil free alkyd resin is diluted in a solvent mixture consisting of 2400 parts xylol, 600 parts ethylene glycol monobutyl ether, thereby obtaining a resin solution having resin component of 50%.

(II) PROCESS FOR PRODUCING VINYL-MODIFIED ALKYD RESINS

Example 5

500 parts of the alkyd resin solution obtained in Example 1, 160 parts of xylene and 40 parts of ethylene glycol monobutyl ether are charged into a reaction vessel provided with a thermometer, stirrer, dropping funnel, reducing cooler and gas-inlet pipe and are sufficiently stirred in nitrogen gas. The temperature of the contents is gradually elevated to 115° C. Then, into this the contents is dropped, for a period of 2 hours, a mixture prepared by 115 parts of styrene, 100 parts of butyl acrylate, 30 parts of 2-hydroxy-ethyl methacrylate, 5 parts of acrylic acid and 7.5 parts of benoyl peroxide. One hour after the end of dropping said mixture of vinyl monomers, into the resulting mixture is dropped, for 15 minutes at 115° C., one-half of a mixture, previously kept in the funnel, consisting of 40 parts xylene, 10 parts ethylene glycol monobutyl ether and 2 parts benzoyl peroxide. Again, after one hour, the remaining one-half of the mixture is dropped for 15 minutes. Thereafter, the reaction is continued while stirring for 3 hours at 115° C.

As a result of this reaction, a solution of vinyl-modified alkyd resin having resin component of 50%, resin acid value of 14.2 and the solution viscosity of G (1.65 stokes by Gardner type bubble viscometer) is obtained.

The vinyl-modified alkyd resin obtained in this example has excellent mutual solubility with other resins and is useful as coating resin. For example, the film properties (e.g. physical properties, chemical properties and the like) of a coating material consisting of the resin obtained in this example and amino resin generally used for coating are as excellent as those of the resins proposed in our copending United States application Ser. No. 830,843. Moreover, its property to resist yellowing at the time of over-baking and whether resistance are better than those of the resins proposed in our above application.

Reference 3.—500 parts of the resin solution obtained in Reference 1, 160 parts of xylene and 40 parts of ethylene glycol monobutyl ether are charged into a reaction vessel equipped in the same manner as in Example 5 and are sufficiently stirred in nitrogen gas. The temperature of the content is gradually elevated to 115° C. Then, into this mixture is dropped, for 2 hours, a mixture prepared by 115 parts of styrene, 100 parts of butyl acrylate, 30 parts of 2-hydroxy-ethyl methacrylate, 5 parts of acrylic acid and 7.5 parts of benzoyl peroxide. One hour after the end of dropping said mixture of vinyl monomers, into the resulting mixture is dropped, for 15 minutes at 115° C., one-half of a mixture, previously kept in the dropping funnel, consisting of 40 parts of xylene, 10 parts of ethylene glycol monobutyl ether and 2 parts of benzoyl peroxide. Again, after one hour, the remaining one-half of the mixture is dropped for 15 minutes. Thereafter, the reaction is continued while stirring for 3 hours at 115° C.

As a result of this reaction, a solution of vinyl graft copolymerized alkyd resin having resin component of 50%, resin acid value of 14.2 and the solution viscosity of G (about 1.65 stokes by Gardner type bubble viscometer) is obtained.

Example 6

525 parts of the alkyd resin obtained in Example 2 and 275 parts of xylene are charged into a reaction vessel equipped in the same way as in Example 5 and are sufficiently stirred in nitrogen gas until the temperature of the contents is elevated to 120° C. With the temperature reaching 120° C., from the dropping funnel is dropped, for one hour and a half, a mixture of 115 parts styrene, 21 parts of ethyl acrylate, 46 parts 2-hydroxy-ethyl methacrylate, 3 parts acrylic acid and 5 parts benzoyl peroxide. 45 minutes after the end of dropping this mixture of vinyl monomers, into the resulting mixture is dropped, for 15 minutes, one-half of a mixture, previously kept in the dropping funnel, consisting of 50 parts xylene and 2 parts benzoyl peroxide. Then, the reaction is continued while stirring for 4 hours.

As a result of this reaction, a solution of vinyl-modified alkyd resin having resin component of 50%, resin acid value of 13.5 and the solution viscosity of L (about 3.00 stokes by Gardner type bubble viscometer) is obtained.

The resin obtained in this example exhibited properties similar to those of the resin obtained in Example 5.

Example 7

640 parts of the solution of oil-modified alkyd resin obtained in Example 3 are charged into a reaction vessel equipped in the same manner as in Example 5 and sufficiently stirred in an atmosphere of circulating nitrogen gas. After the temperature of the contents is elevated to 120° C., from the dropping funnel is dropped, for 2 hours, a mixture of 132 parts methyl methacrylate, 140 parts 2-ethylhexyl acrylate, 48 parts 2-hydroxy-ethyl methacrylate, 80 parts acrylic acid and 16 parts N,N'-azobisisobutylonitrile.

Since in the process of this reaction the temperature of the contents tends to rise to some degree by heat of polymerization, the heat source is regulated to keep the temperature a 120° C. One hour after the end of dropping the mixture of vinyl monomers, to the resulting mixture is dropped, for 15 minutes, a mixture, previously kept in the dropping funnel, consisting of 16 parts ethylene glycol monobutyl ether and 2 parts N,N'-azobisisobutylonitrile. Thereafter, the reaction is continued while stirring for 4 hours.

As a result of this reaction is obtained a viscous solution of vinyl-modified alkyd resin having resin component of 75.7% and resin acid value of 89.0.

Then, the solution of vinyl-modified alkyd resin obtained in this example is subjected to neutralization of its acid radical by amine, thereby obtaining a water-soluble resin. A similar water-soluble resin can also be obtained by neutralizing the above radical by alkali instead of amine. Furthermore, the vinyl-modified alkyd resin obtained in this example is combined with a water-soluble amino resin (e.g. hexakismethoxy-methyl melamine) and this mixture is neutralized by amine to obtain a water-soluble resin varnish. The baked film of this resin varnish exhibited excellent physical properties, solvent-resistance and chemical resistance. These properties were found to be similar to those of the resin proposed in our copending United States application Ser. No. 830,843, but its property to resist yellowing at the time of over-baking and weather resistance were better. In this case by utilizing alkali as neutralizer were obtained the same film properties as in the case amine was employed.

Example 8

500 parts of the vinyl-modified alkyd resin obtained in Example 4, 160 parts of xylene and 40 parts of ethylene glycol monobutyl ether are charged into a reaction vessel equipped in the same manner as in Example 5 and sufficiently stirred in an atmosphere of circulating nitrogen gas.

The temperature of the contents is gradually elevated to 115° C. Then, into this mixture is dropped, for a period of 2 hours, a mixture of 85 parts styrene, 70 parts butyl acrylate, 60 parts 2-hydroxy-ethyl methacrylate, 5 parts acrylic acid and 7.5 parts benzoyl peroxide. One hour after the end of dropping, into the resulting mixture is dropped, for 15 minutes at 115° C., one-half of a mixture, previously kept in the dropping funnel, consisting of 40 parts xylene, 10 parts ethylene glycol monobutyl ether and 2 parts benzoyl peroxide. Further after one hour the remaining one-half of the mixture is dropped for 15 minutes. Thereafter, the reaction is continued while stirring for 3 hours.

As a result of this reaction a solution of vinyl-modified alkyd resin having resin component of 50%, resin acid value of 14.6 and the solution viscosity of E (about 1.25 stokes when measured by Gardner type bubble viscometer) is obtained.

Reference 4.—500 parts of the vinyl-modified alkyd resin obtained in Reference 2, 160 parts of xylene and 40 parts of ethylene glycol monobutyl ether are charged into a reaction vessel equipped in the same manner as in Example 5 and sufficiently stirred in an atmosphere of circulating nitrogen gas. The temperature of the contents is gradually elevated to 115° C. Then, into this mixture is dropped, for a period of 2 hours, a mixture of 85 parts styrene, 70 parts butyl acrylate, 60 parts 2-hydroxy-ethyl methacrylate, 5 parts acrylic acid and 7.5 parts benzoyl peroxide. One hour after the end of dripping, into the resulting mixture is dropped, for 15 minutes at 115° C., one-half of a mixture, previously kept in the dropping funnel, consisting of 40 parts xylene, 10 parts ethylene glycol monobutyl ether and 2 parts benzoyl peroxide. Further, after one hour the remaining one-half of the mixture is dropped for 15 minutes. Thereafter, the reaction is continued while stirring for 3 hours.

As a result of this reaction, a solution of vinyl-modified alkyd resin having resin component of 50%, resin acid value of 14.6 and the solution viscosity of E (about 1.25 stokes when measured by Gardner type bubble viscometer) is obtained.

The vinyl-modified alkyd resin obtained in this example is excellent in its mutual solubility with other resins and useful as a coating resin.

Further, the property to resist yellowing at the time of over-baking, weather resistance and chemical resistance by which the present invention is particularly characterized are tested employing the alkyd resins obtained in the above-described Example 1, Example 5, Example 6, Example 7, Example 8, Reference 1, Reference 3 and Reference 4. The test results are indicated in the following Tables 1 and 2.

TABLE 1

| | I | II | II | IV | V | VI |
|---|---|---|---|---|---|---|
| Resin component: | | | | | | |
| Vinyl modified alkyd resin obtained in | Example 5 | Reference 3 | Example 6 | Example 7 | Example 8 | Reference 4. |
| Amino resin | Isobutyl melamine resin. | Same as probe I. | Same as probe I. | Hexakismethoxy-methyl melamine resin. | Same as probe I. | Same as probe I. |
| Blending ratio: | | | | | | |
| Amino resin/(*1) Vinyl modified alkyd resin | 30/70 | 30/70 | 40/60 | 30/70 | 5/95 | 5/95. |
| Resin (*2)/pigment | 100/80 | 100/80 | 100/80 | 100/80 | 100/80 | 100/80. |
| Film forming process | (*3) 140° C., 30 min. | (*3) 140° C., 30 min. | (*3) 140° C., 30 min. | (*3) 140° C., 30 min. | (*4) 300° C., 60 sec. | (*4) 300° C., 60 sec. |
| Test results: | | | | | | |
| (*5) Weather resistance: | | | | | | |
| First stage | 97 | 98 | 97 | 93 | 98 | 92. |
| After 18 mth | 93 | 80 | 88 | 86 | 95 | 70. |
| (*6) Property to resist yellowing | (*7) 0.74 | (*7) 1.55 | (*7) 1.03 | (*7) 1.15 | (*7) 0.62 | (*7) 2.03. |

NOTE.—Footnotes appear at bottom of Table 2.

TABLE 2

| | I | II | III | IV |
|---|---|---|---|---|
| Resin component: | | | | |
| Vinyl modified alkyd resin or unmodified alkyd resin | Resin obtained in Example 5. | Resin obtained in Reference 3. | Resin obtained in Example 1. | Resin obtained in Reference 1. |
| Amino resin | Isobutyl melamine | Same as probe I | Same as probe I | Same as probe I. |
| Blending ratio: | | | | |
| Amino resin/Alkyd resin (*1) | 30/70 | 30/70 | 30/70 | 30/70. |
| Resin/Pigment (*2) | 100/80 | 100/80 | 100/80 | 100/80 |
| Film forming process (*3) | 140° C., 30 min | 140° C., 30 min | 140° C., 30 min | 140° C., 30 min. |
| Results of test: | | | | |
| Solvent resistance (*8) | No change after 3 days. | No change after 3 days. | Softened after 15 min. | Softened after 15 min. |
| Alkali resistance (*9) | No change after 7 days. | No change after 7 days. | Deteriorated after 3 days. | Deteriorated after 3 days. |
| Boiling water resistance (2 hrs.) (*10) | No change | No change | Bubbles formed, become a little cloudy. | Bubbles formed, become a little cloudy. |
| Salt spray test (5% NaCl solution, 150 hrs.) (*11) | 1.0 mm | 1.0 mm | 5 mm | 4 mm. |

REMARKS

*1: Blending ratio of amino resin and vinyl-modified alkyd resin or vinyl graft polymerized alkyd resin is to be understood to be ratio by their solid components.
*2: Blending ratio of resin and pigment is to be understood to be ratio by their solid components.
*3: Test coating plate is prepared by spraying a probe adjusted to a suitable coating viscosity on a mild steel plate in such a manner that the dried film of the probe may have a thickness of about 30μ. This coating plate is baked for a period of 30 minutes in a hot blast circulating stove adjusted to 140° C.
*4: The same processes (*3) are taken except baking conditions are changed to 300° C. and 60 seconds.
*5: Weather resistance test is performed according to ASTM D-532. The numerical values indicated in the columns "First stage" and "After 18 mth" show 60° mirror reflection factor measured according to ASTM D-333.
*6: This property is determined according to the method specified in ASTM D-1365-60T.
*7: The test plate prepared by the method indicated in (*3) is further baked for one hour at 180° C. in the hot blast circulating stove. This test plate is compared with that in (*3) in order to determine difference in color therebetween according to the method described in (*6). Indicated numerical values are those calculated utilizing L.a.b. Indication Color System. Accordingly, it will be seen that the smaller the numerical value, the less color changes at the time of over-baking.
*8: Solvent resistance (soft steel plate)—A specimen was immersed in xylene at 20° C.
*9: Alkali resistance (glass plate)—A specimen was immersed in 5% aq. solution of sodium hydroxide at 20° C.
*10: Acid resistance (glass plate)—A test plate was immersed in 5% aq. solution of acetic acid at 20° C.
*11: Boiling water resistance (soft steel plate)—After specimen was immersed in boiling water for 2 hours, the state of coating was observed.

From the test results indicated in Table 1 it will be apparent that the vinyl-modified alkyd resins obtained according to the method of this invention have better property to resist yellowing and weather resistance than those proposed in our copending United States application Ser. No. 830,843 have.

What is claimed is:

1. A liquid coating composition comprising (a) 5–40 parts by weight of an amino resin selected from the group consisting of alcohol-modified melamine-formaldehyde condensate and alcohol-modifield benzoguanamine-formaldehyde condensate, (b) 95–60 parts by weight of a vinyl-modified alkyd resin obtained by grafting at least one vinyl monomer onto an alkyd resin of ingredients comprising a polyhydric alcohol and a carboxylic acid wherein 5–60 weight percent of said alkyd resin is hexahydrophthalic acid or the anhydride thereof, and (c) a solvent.

2. A liquid coating composition as claimed in claim 1, in which said amino resin is selected from the group consisting of butylated, isobutylated, sec-butylated, ethylated, methylated, propylated and isopropylated melamine-formaldehyde condensate or benzoguanamine-formaldehyde condensate.

3. A liquid coating composition as claimed in claim 1, in which said vinyl-modified alkyd resin has from 2.0 to 5.0% by weight of free hydroxyl groups in said resin.

4. A liquid coating composition as claimed in claim 1, in which said vinyl monomer is selected from the group consisting of styrene, vinyl toluene, methyl acrylate, ethyl acrylate, butyl acrylate, 2-ethyl hexyl acrylate, methyl methacrylate, ethyl methacrylate, butyl methacrylate, lauryl methacrylate, 2-hydroxy-ethyl methacrylate, 2-hydroxyethyl acrylate, 2-hydroxyl propyl methacrylate, 2-hydroxypropylacrylate, acrylic acid, methacrylic acid, acrylonitrile, acrylamide, α-methylstyrene, methacrylonitrile, glycidylmethacrylate and vinyl acetate.

5. A liquid coating composition as claimed in claim 1, in which said polyhydric alcohol is at least a member selected from the group consisting of trihydric alcohol, pentaerthritol, and mixtures thereof with a glycol.

6. A liquid coating composition as claimed in claim 5, in which said trihydric alcohol is at least a member selected from the group consisting of glycerine, trimethylolehane, trimethylolpropane, and 1,3,6-hexanetriol.

7. A liquid coating composition as claimed in claim 5, in which said glycol is at least a member selected from the group consisting of ethylene glycol, propylene glycol, 1,2-butanediol, 1,2-pentanediol, 2,3-pentanediol, threo-2,3 - pentanediol, erythro-2,3-pentanediol, and 3-methyl-1,2-butanediol; trimethylene glycol, β-butylene glycol, 2,4-pentanediol, 2,2-dimethyltrimethylene glycol, 2,2-dimethyl - 1,3 - butanediol and 2,2-dimethyl-1,3-pentanediol; tetramethylene glycol, 1,4-pentanediol, 3-methyl-2,5-pentanediol, 1,4-hexanediol and 2,5-hexanediol; pentamethylene glycol, 1,5-hexanediol and hexamethylene glycol.

8. A liquid coating composition as claimed in claim 1, in which said hexahydrophthalic acid or its anhydride is used together with mono-basic acids and dibasic acids and the acid anhydrides thereof.

9. A liquid coating composition as claimed in claim 8, in which said dibasic acid is at least a member selected from the group consisting of phthalic acid, isophthalic acid, terephthalic acid, succinic acid, adipic acid, azeraic acid and sebacic acid, and acid anhydrides thereof.

10. A liquid coating composition as claimed in claim 8, in which said monobasic acid is at least a member selected from the group consisting of fatty acids of coconut oil, cotton seed oil, soyabean oil, rice oil, safflower oil and $C_8$ to $C_{18}$ aliphatic monobasic acids.

11. A liquid coating composition as claimed in claim 1, in which said alkyl resin contains from 10 to 40% by weight of oil or fatty acid.

12. A liquid coating composition as claimed in claim 1, in which said alkyd resin is produced by condensing 1 mol of polyhydric alcohol from 0.8 to 1.1 mol of polybasic acid and not more than 1.0 mol of monobasic acid.

References Cited

UNITED STATES PATENTS

| | | | |
|---|---|---|---|
| 3,374,194 | 3/1968 | Wholf | 260—21 |
| 3,502,557 | 3/1970 | Yurcheshen et al. | 204—181 |
| 3,428,479 | 2/1969 | Dobransky | 117—76 |
| 3,634,351 | 1/1972 | Kimura et al. | 260—22 CB |

DONALD E. CZAJA, Primary Examiner

R. W. GRIFFIN, Assistant Examiner

U.S. Cl. X.R.

117—124 E, 132 R, 161 K, 161 LN; 260—22 CB, 29.4 UA, 33.6 R, 850